United States Patent
Jiang

(10) Patent No.: US 12,369,133 B2
(45) Date of Patent: Jul. 22, 2025

(54) METHOD AND DEVICE FOR UPDATING UPLINK TIMING ADVANCE, AND METHOD AND DEVICE FOR DETERMINING UPDATE CONFIGURATION

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 37 days.

(21) Appl. No.: 18/259,620

(22) PCT Filed: Dec. 31, 2020

(86) PCT No.: PCT/CN2020/142555
§ 371 (c)(1),
(2) Date: Jun. 28, 2023

(87) PCT Pub. No.: WO2022/141597
PCT Pub. Date: Jul. 7, 2022

(65) Prior Publication Data
US 2024/0323879 A1    Sep. 26, 2024

(51) Int. Cl.
*H04W 56/00* (2009.01)
*H04W 8/22* (2009.01)
*H04W 24/02* (2009.01)

(52) U.S. Cl.
CPC ......... *H04W 56/0045* (2013.01); *H04W 8/22* (2013.01); *H04W 24/02* (2013.01)

(58) Field of Classification Search
CPC ... H04W 56/0045; H04W 8/22; H04W 24/02; H04W 8/24; H04W 52/0212; H04W 52/0209; H04W 56/00; H04B 7/18504; H04B 7/18513; H04B 7/1853; Y02D 30/70
USPC .......................................................... 340/503
See application file for complete search history.

(56) References Cited

U.S. PATENT DOCUMENTS

| | | | |
|---|---|---|---|
| 2018/0139747 A1* | 5/2018 | Hosseini | H04W 72/0446 |
| 2019/0223178 A1 | 7/2019 | Bergström et al. | |
| 2020/0029291 A1 | 1/2020 | Siomina | |
| 2020/0196263 A1* | 6/2020 | Heyn | H04W 56/0005 |
| 2020/0367187 A1 | 11/2020 | Palenius et al. | |
| 2021/0266849 A1* | 8/2021 | Uchino | H04W 56/001 |
| 2021/0289495 A1* | 9/2021 | Korhonen | H04W 72/0446 |

(Continued)

FOREIGN PATENT DOCUMENTS

| | | | | |
|---|---|---|---|---|
| CN | 111316723 A | | 6/2020 | |
| WO | WO-2020034574 A1 * | | 2/2020 | H04B 7/1851 |

OTHER PUBLICATIONS

International Search Report and Written Opinion of International Application No. PCT/CN2020/142555, dated Sep. 28, 2021, 16 pages.

(Continued)

*Primary Examiner* — Omar Casillashernandez
(74) *Attorney, Agent, or Firm* — Finnegan, Henderson, Farabow, Garrett & Dunner, L.L.P.

(57) ABSTRACT

A method for updating an uplink timing advance is performed by a terminal, and includes: determining update configuration; and updating the uplink timing advance based on the update configuration.

19 Claims, 12 Drawing Sheets

(56) References Cited

U.S. PATENT DOCUMENTS

2022/0150858 A1* 5/2022 Ren .................... H04B 7/18589

OTHER PUBLICATIONS

The First Office Action for Chinese Application No. 202080004132.5, Aug. 3, 2022, 13 pages.
English translation of the Second Office Action for Chinese Application No. 202080004132.5, Mar. 23, 2023, 5 pages.
Partial Supplementary European Search Report issued in Application No. 20967935.6 dated Oct. 1, 2024, 19 pages.
Huawei, HiSilicon, "Discussion on Doppler compensation, timing advance and RACH for NTN", 3GPP TSG RAN WG1 Meeting #98bis, R1-1910064, Chongqing, China, Oct. 14-20, 2019, 8 pages.

* cited by examiner

METHOD AND DEVICE FOR UPDATING UPLINK TIMING ADVANCE, AND METHOD AND DEVICE FOR DETERMINING UPDATE CONFIGURATION

CROSS-REFERENCE TO RELATED APPLICATION

This application is a national phase of International Application No. PCT/CN2020/142555, filed on Dec. 31, 2020, the entire content of which is incorporated herein by reference.

TECHNICAL FIELD

The disclosure relates to the field of communication technologies, and in particular, to a method for updating an uplink timing advance, a method for determining update configuration, an apparatus for updating an uplink timing advance, an apparatus for determining update configuration, an electronic device and a computer-readable storage medium.

BACKGROUND

To enable a terminal to perform an uplink synchronization, a base station may indicate a timing advance to the terminal, and the terminal may obtain the uplink synchronization based on the timing advance indicated by the base station. However, a size of the timing advance that the base station can indicate is limited and may not exceed 2 milliseconds maximally.

Furthermore, in non-terrestrial networks (NTN), the terminal and the ground base station communicate with each other through a satellite. Since the satellite is in the air, it takes a long duration to send signals from the ground to the satellite and then from the satellite to the ground, so a large delay can occur, and the maximum delay can reach more than 500 milliseconds, which is far greater than the timing advance that can be indicated by the base station.

SUMMARY

According to a first aspect of the disclosure, a method for updating an uplink timing advance is provided. The method is applicable to a terminal. The method includes:
  determining update configuration; and
  updating the uplink timing advance based on the update configuration.

According to a second aspect of the disclosure, a method for determining update configuration is provided. The method is applicable to a base station. The method includes at least one of:
  receiving first update configuration from a terminal or sending second update configuration to the terminal;
  at least one of the first update configuration or the second update configuration are configured for the terminal to update an uplink timing advance.

According to a third aspect of embodiments of the disclosure, a terminal is provided. The terminal includes:
  a processor; and
  a memory for storing instructions executable by the processor.

The processor is configured to perform the above method for updating an uplink timing advance.

According to a fourth aspect of embodiments of the disclosure, a base station is provided. The base station includes:
  a processor; and
  a memory for storing instructions executable by the processor.

The processor is configured to perform the above method for determining update configuration.

BRIEF DESCRIPTION OF THE DRAWINGS

A brief description of drawings used in descriptions of the embodiments is given below. The drawings in the following descriptions are only example embodiments of the disclosure, and for a person skilled in the art, other embodiments may be obtained.

DETAILED DESCRIPTION

Technical solutions in embodiments of the disclosure will be clearly and completely described below with reference to the accompanying drawings in the embodiments of the disclosure. Obviously, the described embodiments are only example embodiments of the disclosure, but not all of the embodiments. Based on the embodiments in the disclosure, other embodiments obtained by a person skilled in the art may fall within the protection scope of the disclosure.

Figure 1:
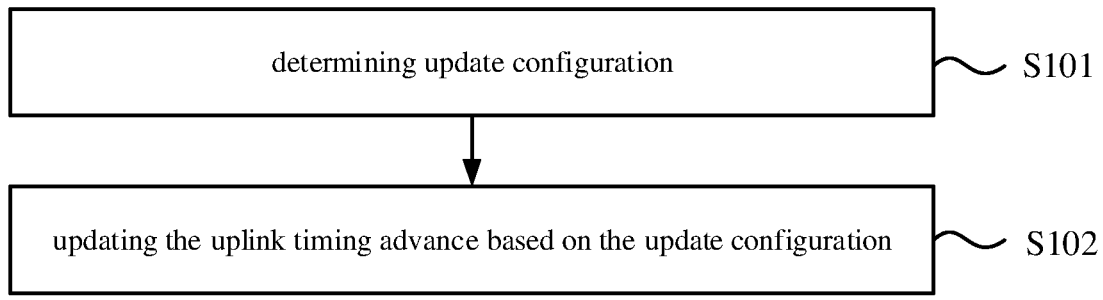
FIG. 1 is a schematic flowchart of a method for updating an uplink timing advance according to some embodiments of the disclosure.

FIG. 1 is a schematic flowchart of a method for updating an uplink timing advance according to some embodiments of the disclosure. The method for updating an uplink timing advance illustrated in some embodiments may be applicable to a terminal. The terminal includes but is not limited to an electronic device such as a mobile phone, a tablet computer, a wearable device, a sensor or an Internet of Things (IoT) device. The terminal, as a user equipment (UE), may communicate with a base station. The base station includes but is not limited to a fourth generation (4G) base station, a fifth generation (5G) base station or a sixth generation (6G) base station.

In some embodiments, the terminal and the base station may be located on the ground. The terminal may communicate with the base station through an aerial device. For example, the base station sends information to the aerial device, and the aerial device sends the information to the terminal. The aerial device includes but is not limited to a satellite, an unmanned aerial vehicle (UAV) or an aerial platform. The aerial device may move in the air.

As illustrated in FIG. 1, the method for updating an uplink timing advance includes the following steps.

In step S101, update configuration is determined.

In step S102, the uplink timing advance is updated based on the update configuration.

In some embodiments, the terminal may determine the update configuration for the uplink timing advance and update the uplink timing advance based on the update configuration. In these embodiments and the previous embodiments, the update action may be the automatic update or the non-automatic update.

In some embodiments, the update configuration may include an update frequency for the uplink timing advance, an update step for the uplink timing advance or the like. The two parameters of update frequency and update step may be collectively referred to as time drift rate R, that is, an update amount required per unit time for the uplink timing advance. The update frequency may be determined based on the unit time. The unit time may be one or more of: frame, subframe, time-domain symbol, time slot, second, millisecond or the like.

For example, the terminal may calculate the uplink timing advance by the following formula of.

$$TA = (N_{TA} + N_{TA,offset}[+X]) \times T_c[+X];$$

where, X is a common timing offset broadcasted by a network, $N_{TA}$ is obtained based on a specific timing advance of the terminal (UE specific TA), $N_{TA,offset}$ is an offset of TA which can be a known defined value, and $T_c$ is a known defined value.

It should be noted that X in the above formula only appears once. For example, if it appears in the parentheses in the formula, it is $(N_{TA}+N_{TA,offset}+X) \times T_c$. In this case, X can be a unitless quantity. If it appears in the end of the formula, it is $TA=(N_{TA}+N_{TA,offset}) \times T_c+X$. In this case, the unit of X may be a time unit, such as millisecond, second, frame or the like.

In some embodiments, the common timing offset broadcasted by the network may include two parts. One part is the common timing offset that needs the terminal to compensate, referred to as $X_1$, and the other part is the common timing offset that needs the network (such as satellite, base station) to compensate, referred to as $X_2$. The terminal may determine the uplink timing advance according to the above embodiments, based on the common timing offset. $X_1$ which needs the terminal to compensate. In addition, the cell can also broadcast a sum of $X_1$ and $X_2$, and one of $X_1$ and $X_2$, the other of $X_1$ and $X_2$ can be obtained by the terminal through subtraction.

For example, the update configuration is applicable to $N_{TA}$, that is, the terminal updates $N_{TA}$ based on the update configuration, thereby updating TA, so that the update step may be an offset of $N_{TA}$ or a value of the same dimension as $N_{TA}$. For example, the update configuration is applicable to the overall uplink timing advance TA, that is, the terminal updates TA based on the update configuration, so that the update step may be an offset of TA or a value in units of time.

Taking the update configuration applicable to the overall uplink timing advance as an example, the uplink timing advance is updated based on the time drift rate R in the update configuration. An uplink timing advance $TA_0$ at a start moment may be determined and a duration t from the start moment to an update moment may be determined, and then the updated $$TA = TA_0 + t \times R.$$

In some embodiments, the terminal may autonomously determine the start moment for updating the uplink timing advance, and the start moment is at least one of:
- determining a boundary of a system information window located by a moment of the update configuration, such as a start boundary of the system information window or an end boundary of the system information window;
- determining a boundary of a nearest system frame number previous to the update configuration or following the update configuration, such as a start boundary of the system frame number or an end boundary of the system frame number; or
- determining a boundary of a transmission period of a system information block SIB1 previous to the update configuration or following the update configuration, such as a start boundary of the transmission period or an end boundary of the transmission period, in which the system information block SIB1 is configured to carry the common timing-related information.

In some embodiments, the update moment may be periodic and the specific period may be indicated by the network or pre-stored by the terminal. The update moment may also be aperiodic, and the network may indicate the specific update moment or the update moment is determined according to an update offset. For example, the start moment plus the update offset equals the update moment, and the update offset may be indicated by the network or pre-stored by the terminal.

Since the aerial device such as the satellite is generally in high speed motion, the uplink timing advance is constantly varying as the aerial device moves. Although the network may continuously send the adjustment command, such as the TA command, to the terminal to adjust the uplink timing advance to ensure that the adjusted uplink timing advance satisfies changes on the round trip time (RT) among the terminal, the aerial device and the base station, the change on the RTT may reach 40 μs/s for the satellite located at the high altitude such as 600 kilometers. In some cases, such as when the sub-carrier is 240 KHz, the maximum value that the network may adjust the TA by the adjustment command is 1 μs, so that when the change on the RTT is 40 μs/s, 40 adjustment commands need to be sent to the terminal per second, which may cause a lot of signaling overheads and increase the power consumption of the terminal.

According to the embodiments of the disclosure, the terminal may update the uplink timing advance based on the update configuration, so that even if the network does not send the adjustment command for the uplink timing advance to the terminal, the adjustment of the uplink timing advance may be automatically completed, which is beneficial to reducing the signal overhead and reducing the power consumption of the terminal.

In some embodiments, after the uplink timing advance is determined, the terminal may perform an uplink synchronization based on the uplink timing advance when sending uplink information. For example, pre-compensating a first message Msg1/MsgA for sending random access based on the determined uplink timing advance when performing a random access.

Figure 2:
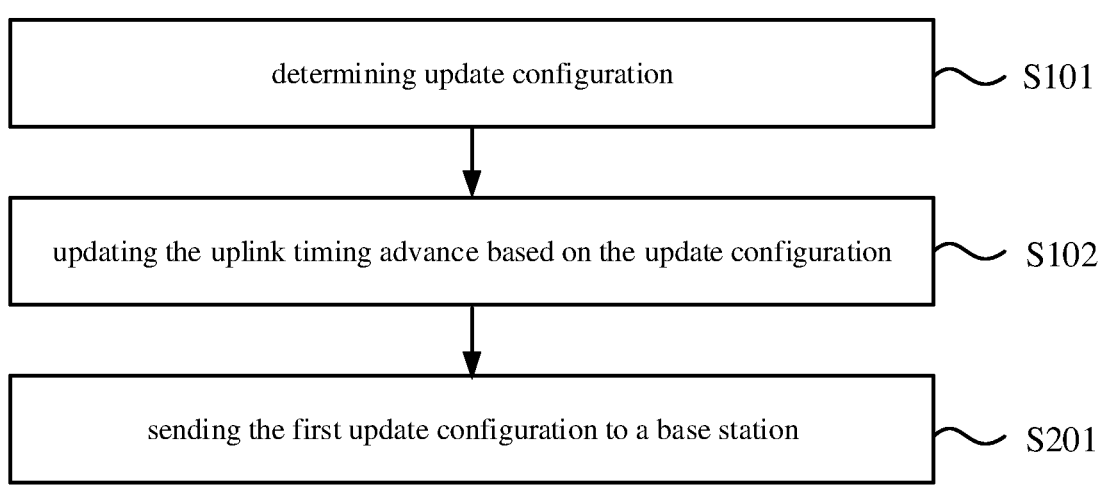
FIG. 2 is a schematic flowchart of another method for updating an uplink timing advance according to some embodiments of the disclosure.

FIG. 2 is a schematic flowchart of another method for updating an uplink timing advance according to some embodiments of the disclosure. As illustrated in FIG. 2, in some embodiments, the update configuration is first update configuration determined autonomously by the terminal, and the method further includes the following step.

In step S201, the first update configuration is sent to a base station. For example, the first update configuration may be automatically sent to the base station or the first update configuration may be sent to the base station when a request from the base station is received.

In some embodiments, the terminal may carry the first update configuration in an uplink radio resource control (RRC) message, such as UEAssistanceInformation, RRC-SetupComplete, RRCResumeComplete. Or the terminal may carry the first update configuration in a medium access control (MAC) control element (CE).

In some embodiments, the terminal may determine its own position and the position of the satellite, its own speed and the speed of the satellite, as well as the ephemeris information of the satellite and the like, and determine the RTT change rate between the terminal and the aerial device according to the information and determine the first update configuration based on the determined change rate. How to apply these parameters to calculate the change rate may be set as required, which is not limited in the disclosure.

After the first update configuration is determined, the first update configuration may be sent to the base station, so that the base station may determine how the terminal updates the uplink timing advance, so as to receive the first message of the random access, which is compensated by the terminal based on the updated uplink timing advance.

In some embodiments, the terminal may not send the first update configuration to the base station. Whether to send the first update configuration to the base station may be determined by the terminal itself or may be agreed between the terminal and the base station.

In some embodiments, the first update configuration includes at least one of:
- whether to update the uplink timing advance, an update frequency for the uplink timing advance, an update step for the uplink timing advance, a suggested value of an uplink time alignment timer (TimeAlignmentTimer, TAT), or a suggested value of an uplink time alignment timer of a preconfigured uplink resource.

The uplink time alignment timer may be used by the terminal to determine whether the uplink is synchronized in the connected state. After the uplink time alignment timer expires, the terminal determines that there is no uplink synchronization; and the uplink time alignment timer of the preconfigured uplink resource (pur-TimeAlignmentTimer) may be used by the terminal to determine whether the uplink is synchronized in the non-connected state (for example, inactive state, idle state). After the uplink time alignment timer of the preconfigured uplink resource expires, the terminal determines that there is no uplink synchronization. The uplink time alignment timer of the preconfigured uplink resource may be carried in the configuration request of the preconfigured uplink resource, PURConfigurationRequest, and sent to the base station.

The preconfigured uplink resource (PUR) may be requested by the terminal in the connected state from the base station. When the base station configures the preconfigured uplink resource for the terminal, after the terminal enters the non-connected state and under a case that specific conditions are satisfied, the preconfigured uplink resources is used to communicate with the base station. The above-mentioned specific conditions include, but are not limited to, the validity of the timing advance of the terminal satisfies the requirements and the signal quality change of the serving cell does not exceed a certain threshold. The preconfigured uplink resource may be configured for a IoT terminal, such as long term evolution (LTE) enhance machine type communication (eMTC)/narrow-band IoT (NB-IoT) terminal.

In some embodiments, a transmission prohibition timer may be set, which is started or restarted every time the terminal sends the first update configuration to the base station. Before the transmission prohibition timer expires, even if the first update configuration changes, the terminal does not send the first update configuration to the base station. After the transmission prohibition timer expires, if the first update configuration changes, the changed first update configuration may be sent to the base station. Accordingly, it is beneficial to preventing the terminal from frequently sending the first update configuration to the base station and occupying resources too much.

Figure 3:
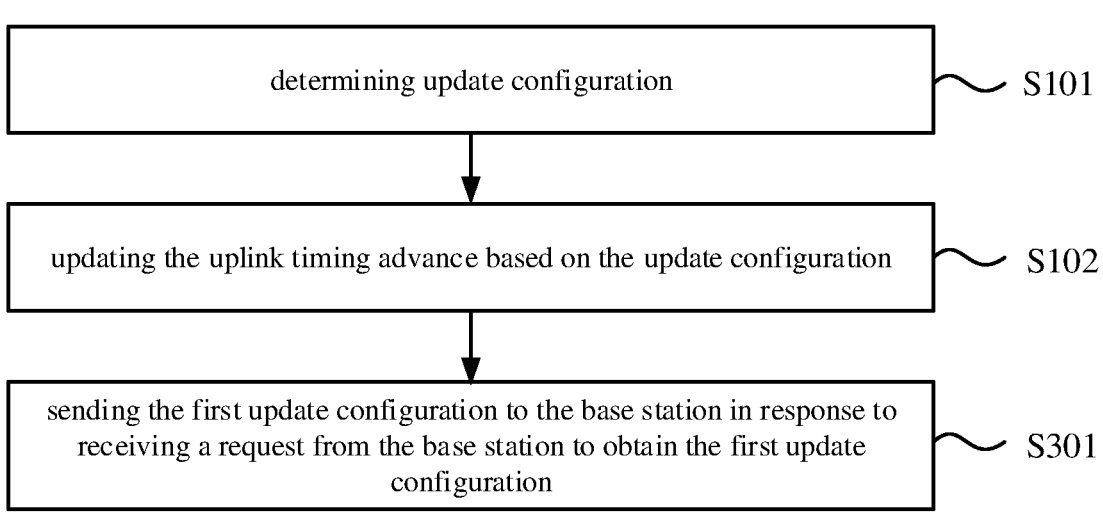
FIG. 3 is a schematic flowchart of another method for updating an uplink timing advance according to some embodiments of the disclosure.

FIG. 3 is a schematic flowchart of another method for updating an uplink timing advance according to some embodiments of the disclosure. As illustrated in FIG. 3, in some embodiments, sending the first update configuration to the base station includes the following step.

In step S301, the first update configuration is sent to the base station in response to receiving a request from the base station to obtain the first update configuration.

In some embodiments, the terminal may send the first update configuration to the base station after receiving the request from the base station to obtain the first update configuration. For example, the request may be UEInformationRequest, and for the request, the terminal may carry the first update configuration in UEInformationResponse and send it to the base station.

Figure 4:
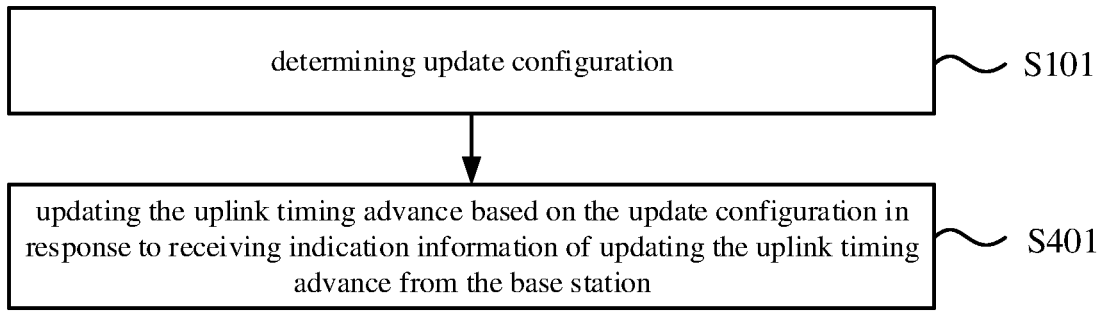
FIG. 4 is a schematic flowchart of another method for updating an uplink timing advance according to some embodiments of the disclosure.

FIG. 4 is a schematic flowchart of another method for updating an uplink timing advance according to some embodiments of the disclosure. As illustrated in FIG. 4, in some embodiments, updating the uplink timing advance based on the update configuration includes the following step.

In step S401, the uplink timing advance is updated based on the update configuration in response to receiving indication information of updating the uplink timing advance from the base station.

In some embodiments, the operation of updating the uplink timing advance based on the update configuration by the terminal may be performed only when receiving the indication information of updating the uplink timing advance from the base station, which facilitates controlling the terminal for the base station.

Figure 5:
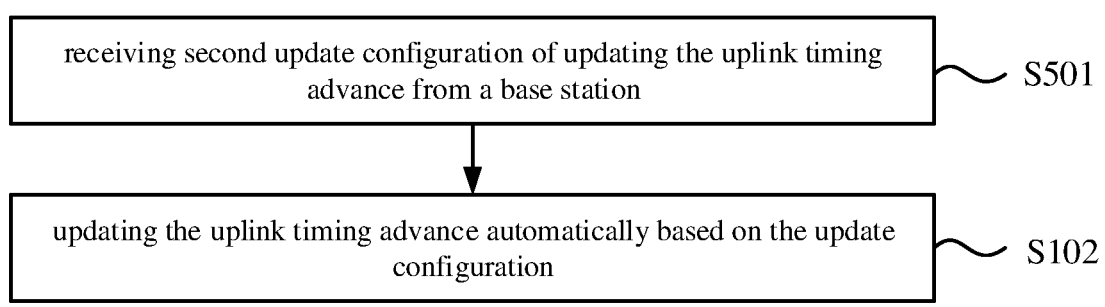
FIG. 5 is a schematic flowchart of another method for updating an uplink timing advance according to some embodiments of the disclosure.

FIG. 5 is a schematic flowchart of another method for updating an uplink timing advance according to some embodiments of the disclosure. As illustrated in FIG. 5, in some embodiments, determining the update configuration includes the following step.

In step S501, second update configuration of updating the uplink timing advance is received from a base station.

In some embodiments, the update configuration may be the second update configuration sent by the base station to the terminal, that is, the base station may instruct the terminal how to update the uplink timing advance by sending the second update configuration to the terminal, thereby improving the flexibility of controlling the terminal by the base station.

In some embodiments, the second update configuration includes at least one of:

whether to update the uplink timing advance, an update moment of updating the uplink timing advance, an update frequency for the uplink timing advance, an update step for the uplink timing advance, or a value of an uplink time alignment timer.

The update moment of updating the uplink timing advance may be indicated by the base station. The update moment indicated by the base station may be an absolute moment or a relative moment, for example, it is an offset relative to the moment when the terminal receives the second update configuration. In the case of indicating the absolute moment, it may specifically indicate which time-domain symbol in which subframe under which system frame number to be the update moment. In the case of indicating the relative moment, it may specifically indicate that the relative moment is how many time-domain symbols previous to or following the moment when the second update configuration is received by the terminal.

Figure 6:
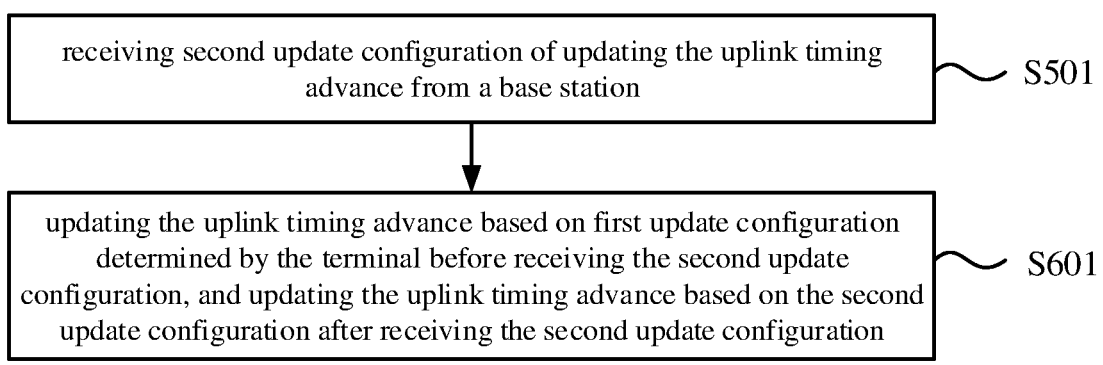
FIG. 6 is a schematic flowchart of another method for updating an uplink timing advance according to some embodiments of the disclosure.

FIG. 6 is a schematic flowchart of another method for updating an uplink timing advance according to some embodiments of the disclosure. As illustrated in FIG. 6, in some embodiments, updating the uplink timing advance based on the update configuration includes the following step.

In step S601, the uplink timing advance is updated based on first update configuration determined by the terminal before receiving the second update configuration, and the uplink timing advance is updated based on the second update configuration after receiving the second update configuration.

In some embodiments, the terminal may independently determine the first update configuration and may also receive the second update configuration sent by the base station. Before receiving the second update configuration, the terminal may update the uplink timing advance based on the first update configuration independently determined by the terminal, so as to ensure updating the uplink timing advance efficiently. After receiving the second update configuration, the terminal may update the uplink timing advance based on the second update configuration, so as to ensure controlling the terminal by the base station.

Figure 7:
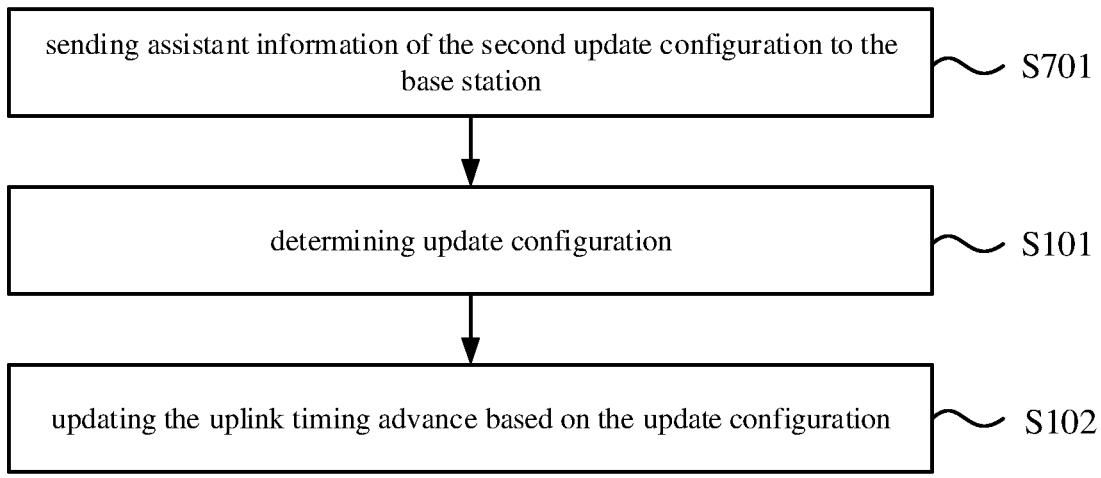
FIG. 7 is a schematic flowchart of another method for updating an uplink timing advance according to some embodiments of the disclosure.

FIG. 7 is a schematic flowchart of another method for updating an uplink timing advance according to some embodiments of the disclosure. As illustrated in FIG. 7, in some embodiments, the method further includes the following step.

In step S701, assistant information of the second update configuration is sent to the base station.

In some embodiments, the terminal may send the assistant information of the second update configuration to the base station, and the base station may determine the second update configuration based on the received assistant information, so that the second update configuration sent to the terminal satisfies the needs of the terminal.

The terminal may carry the assistant information of the second update configuration in UEAssistanceInformation and send it to the base station. The assistant information of the second update configuration includes but is not limited to at least one of the following: a suggested value of the update frequency for the uplink timing advance, a suggested value of the update step for the uplink timing advance, a suggested value of the uplink time alignment timer, or a suggested value of the uplink time alignment timer of the preconfigured uplink resource.

In addition, a transmission prohibition timer may be set, which is started or restarted every time the terminal sends the assistant information of the second update configuration to the base station. Before the transmission prohibition timer expires, even if the assistant information changes, the terminal does not send the assistant information to the base station. After the transmission prohibit timer expires, if the assistant information changes, the changed assistant information may be sent to the base station. Accordingly, it is beneficial to avoiding the terminal from frequently sending the assistant information to the base station and occupying too many resources.

Figure 8:
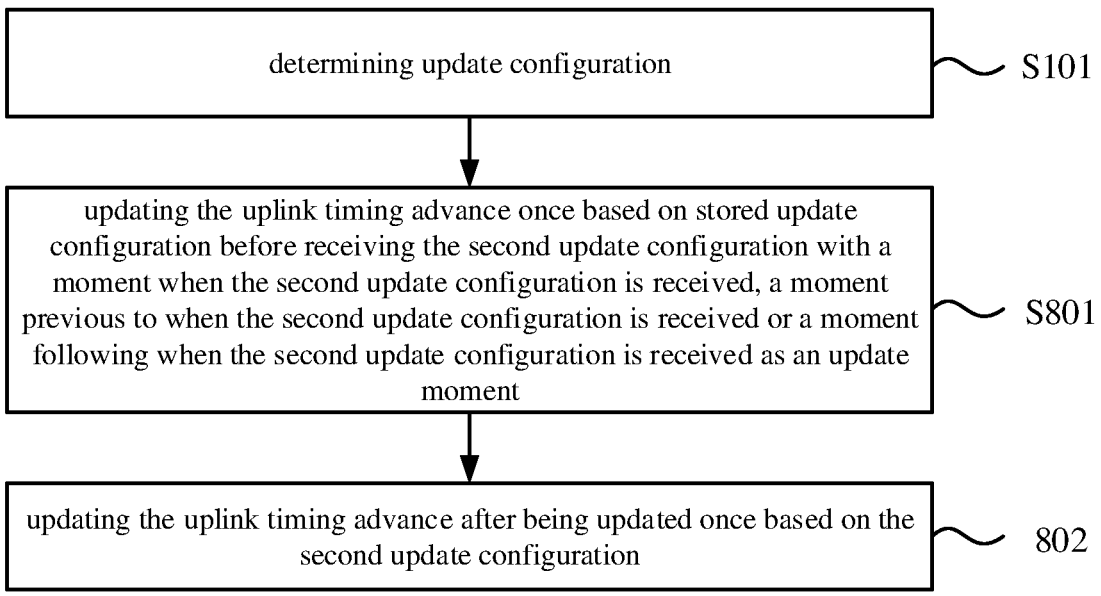
FIG. 8 is a schematic flowchart of another method for updating an uplink timing advance according to some embodiments of the disclosure.

FIG. 8 is a schematic flowchart of another method for updating an uplink timing advance according to some embodiments of the disclosure. As illustrated in FIG. 8, in some embodiments, updating the uplink timing advance based on the update configuration includes the following steps.

In step S801, the uplink timing advance is updated once based on stored update configuration before receiving the second update configuration with a moment when the second update configuration is received, a moment previous to when the second update configuration is received or a moment following when the second update configuration is received as an update moment.

In step S802, the uplink timing advance after being updated once is updated based on the second update configuration.

In some embodiments, the terminal has stored the update configuration before receiving the second configuration, for example, the second update configuration received by the terminal last time or the first update configuration determined by the terminal autonomously. After receiving the second update configuration, the stored update configuration may be used to update the uplink timing advance once with the moment when the second update configuration is received, the moment previous to when the second update configuration is received or the moment following when the second update configuration is received as the update moment, and the uplink timing advance after the one update is updated again based on the second update configuration. Accordingly, it is possible to prevent the second update configuration from being too different from the stored update configuration to cause the inconsistency in the update, which is beneficial to ensuring the continuity of the update, thereby ensuring the accuracy of the update.

In some embodiments, the moment previous to when the second update configuration is received may be half of the round-trip delay between the terminal and the base station.

It should be noted that, updating a certain moment refers to updating the uplink timing advance at the certain moment as the update moment.

Figure 9:
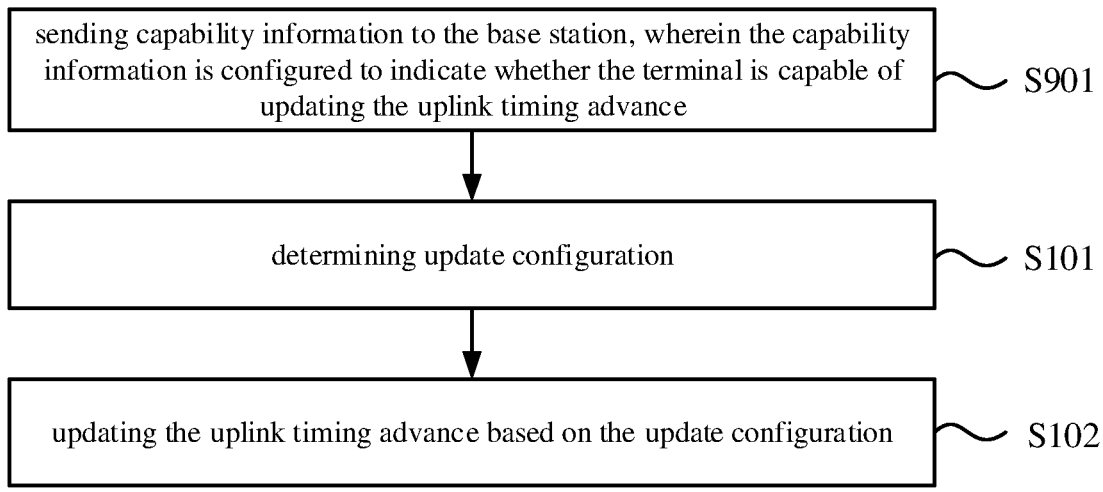
FIG. 9 is a schematic flowchart of another method for updating an uplink timing advance according to some embodiments of the disclosure.

FIG. 9 is a schematic flowchart of another method for updating an uplink timing advance according to some embodiments of the disclosure. As illustrated in FIG. 9, in some embodiments, the method further includes the following step.

In step S901, capability information is sent to the base station, in which the capability information is configured to indicate whether the terminal is capable of updating the uplink timing advance.

In some embodiments, the terminal may send the capability information to the base station, and use the capability information to inform the base station whether the terminal supports updating the uplink timing advance, in which the capability information may be carried in UECapabilityInformation and sent to the terminal.

Figure 10:
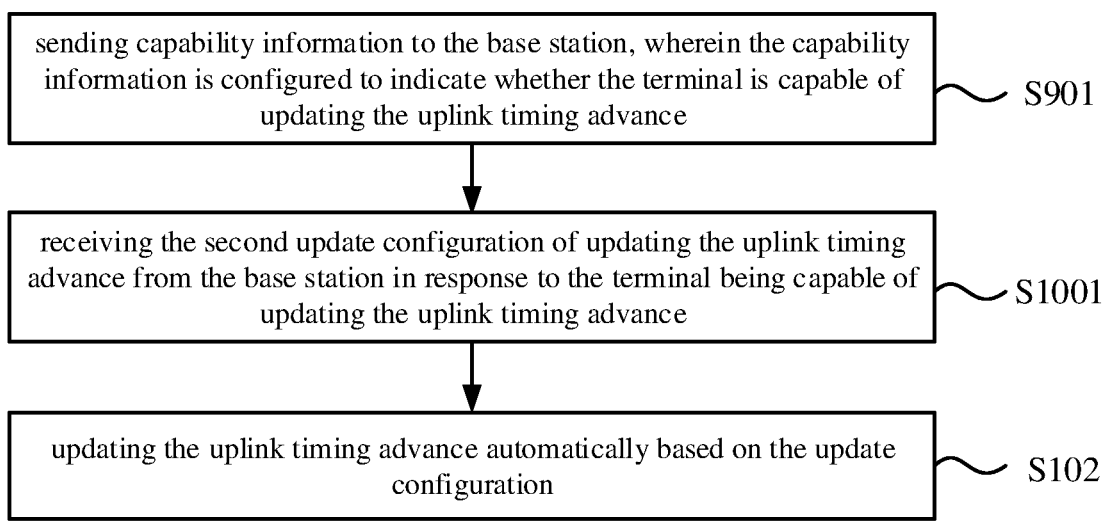
FIG. 10 is a schematic flowchart of another method for updating an uplink timing advance according to some embodiments of the disclosure.

FIG. 10 is a schematic flowchart of another method for updating an uplink timing advance according to some embodiments of the disclosure. As illustrated in FIG. 10, in some embodiments, receiving the second update configuration of updating the uplink timing advance from the base station includes the following.

In step S1001, the second update configuration of updating the uplink timing advance is received from the base station in response to the terminal being capable of updating the uplink timing advance (such as automatically updating).

In some embodiments, the base station sends the second update configuration to the terminal only when it is determined according to the capability information that the terminal supports updating the uplink timing advance, so that the terminal receives the second update configuration; otherwise, the base station does not send the second update configuration to the terminal, and the terminal does not have to receive the second update configuration, so as to avoid wasting communication resources.

Figure 11:
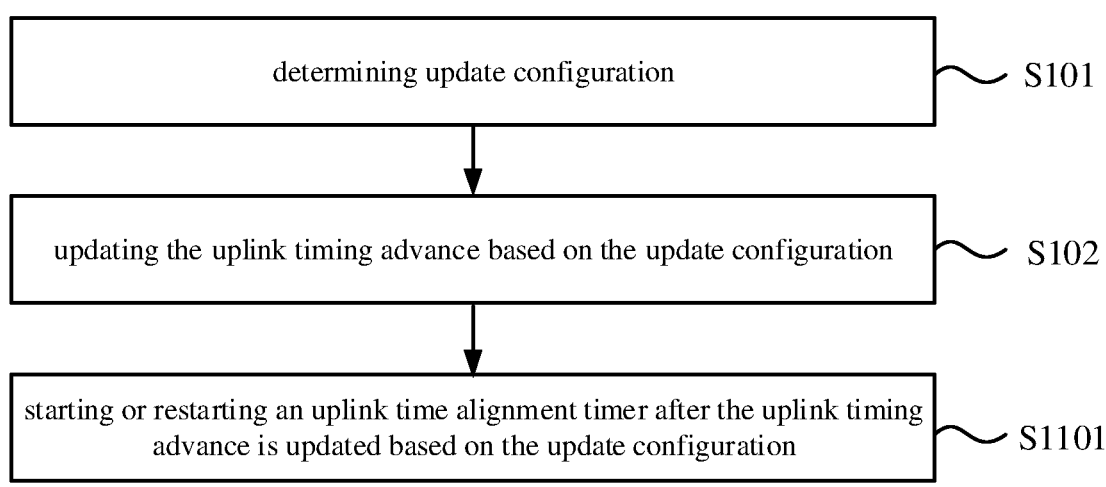
FIG. 11 is a schematic flowchart of another method for updating an uplink timing advance according to some embodiments of the disclosure.

FIG. 11 is a schematic flowchart of another method for updating an uplink timing advance according to some embodiments of the disclosure. As illustrated in FIG. 11, in some embodiments, the method further includes the following.

In step S1101, an uplink time alignment timer is started or restarted after the uplink timing advance is updated based on the update configuration.

In some embodiments, the uplink time alignment timer may be started or restarted after the uplink timing advance is updated based on the update configuration, that is, after the uplink timing advance is updated, and before the uplink time alignment timer expires, it is considered that the uplink is synchronized.

In some embodiments, the value of the uplink time alignment timer may be configured as required. For example, if the value of the uplink time alignment timer is infinite, it is not necessary to start or restart the uplink time alignment timer.

Figure 12:
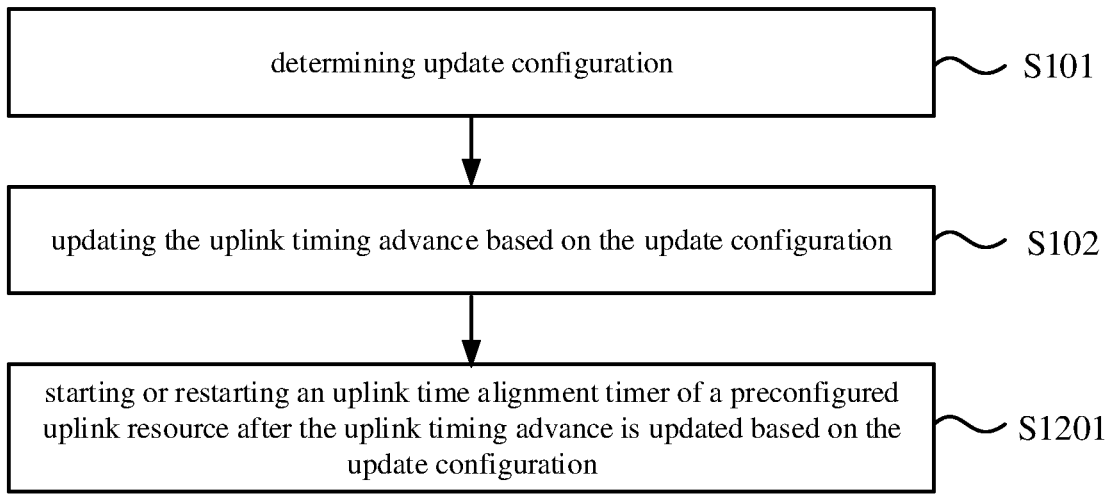
FIG. 12 is a schematic flowchart of another method for updating an uplink timing advance according to some embodiments of the disclosure.

FIG. 12 is a schematic flowchart of another method for updating an uplink timing advance according to some embodiments of the disclosure. As illustrated in FIG. 12, in some embodiments, the method further includes the following step.

In step S1201, an uplink time alignment timer of a preconfigured uplink resource is started or restarted after the uplink timing advance is updated based on the update configuration.

In some embodiments, after the uplink timing advance is updated based on the update configuration, the uplink time alignment timer of the preconfigured uplink resource may be started or restarted, that is, after the uplink timing advance is updated, and before the uplink time alignment timer of the preconfigured uplink resource expires, it is considered that the uplink is synchronized.

In some embodiments, the value of the uplink time alignment timer of the preconfigured uplink resource may be configured as required. For example, if the value of the uplink time alignment timer of the preconfigured uplink resource is infinite, it is not necessary to start or restart the uplink time alignment timer.

It should be noted that the embodiments in FIG. 11 can be applied to a terminal in a connected state, and the embodiments in FIG. 12 can be applied to a terminal in a non-connected state.

Figure 13:
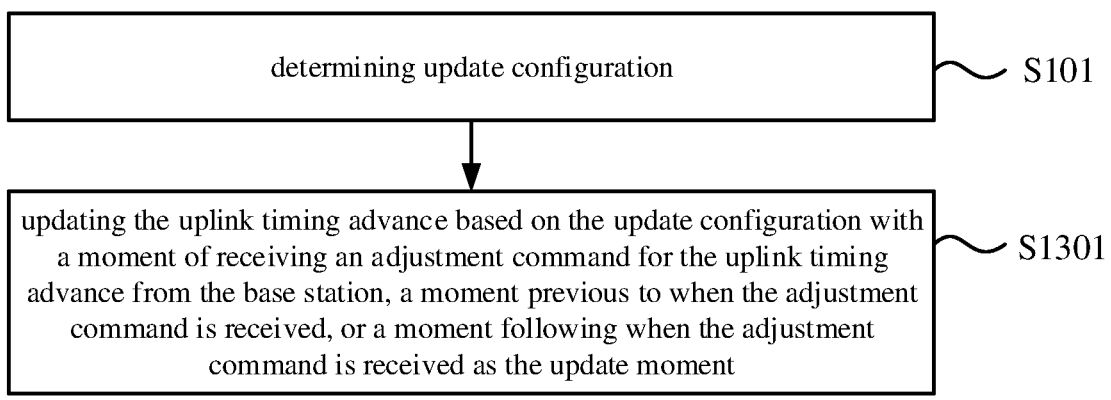
FIG. 13 is a schematic flowchart of another method for updating an uplink timing advance according to some embodiments of the disclosure.

FIG. 13 is a schematic flowchart of another method for updating an uplink timing advance according to some embodiments of the disclosure. As illustrated in FIG. 13, in some embodiments, updating the uplink timing advance based on the update configuration includes the following step.

In step S1301, the uplink timing advance is updated based on the update configuration with a moment of receiving an adjustment command for the uplink timing advance from the base station, a moment previous to when the adjustment command is received, or a moment following when the adjustment command is received as the update moment.

In some embodiments, the base station may adjust the uplink timing advance determined by the terminal by sending the TA command for adjusting the uplink timing advance to the terminal.

In the case of receiving the adjustment command, the terminal has generally determined the update configuration, for example, the first update configuration determined by the terminal autonomously or the second update configuration received from the network. After receiving the adjustment, when the determined update configuration is used to update, the moment of receiving the adjustment command for the uplink timing advance from the base station, the moment previous to when the adjustment command is received, or the moment following when the adjustment command is received may be taken as the update moment.

In some embodiments, the adjustment command may be carried by a protocol data unit (PDU) of the medium access control (MAC). The moment of receiving the adjustment command may be the start moment or the end moment of sending the MAC PDU. The moment previous to when the adjustment command is received may be half of the round-trip delay between the terminal and the base station.

In some embodiments, the uplink timing advance may be updated first based on the update configuration, or the uplink timing advance may be adjusted first based on the adjustment command, which may be specifically set as required.

Figure 14:
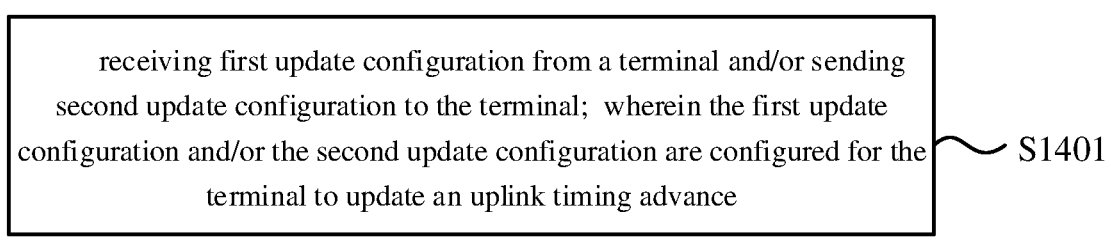
FIG. 14 is a schematic flowchart of a method for determining update configuration according to some embodiments of the disclosure.

FIG. 14 is a schematic flowchart of a method for determining update configuration according to some embodiments of the disclosure. The method for determining update configuration illustrated in some embodiments may be applicable to a base station. The base station includes but is not limited to a 4G base station, a 5G base station or a 6G base station. The base station may communicate with a terminal that is a UE. The terminal includes but is not limited to an electronic device such as a mobile phone, a tablet computer, a wearable device, a sensor or an IoT device. In some embodiments, the terminal may be a terminal to which the method for updating an uplink timing advance described in any of the foregoing embodiments is applicable.

In some embodiments, the terminal and the base station may be located on the ground. The terminal may communicate with the base station through an aerial device. For example, the base station sends information to the aerial device, and the aerial device sends the information to the terminal. The aerial device includes but is not limited to a satellite, a UAV or an aerial platform. The aerial device may move in the air.

As illustrated in FIG. 14, the method for determining update configuration may include the following step.

In step S1401, first update configuration from a terminal is received and/or second update configuration is sent to the terminal.

The first update configuration and/or the second update configuration are configured for the terminal to update an uplink timing advance.

In some embodiments, the terminal may determine the first update configuration for the uplink timing advance, then update the uplink timing advance based on the first update configuration, and may send the determined first update configuration to the base station. The base station may also indicate the second update configuration to the terminal, so that the terminal may update the uplink timing advance based on the second update configuration.

In some embodiments, both the first update configuration and the second update configuration may include an update frequency for the uplink timing advance, an update step for the uplink timing advance, and the like. The two parameters of update frequency and update step may be collectively referred to as time drift rate R, that is, an update amount required per unit time for the uplink timing advance. The update frequency may be determined based on the unit time. The unit time may be one or more of: frame, subframe, time-domain symbol, time slot, second, millisecond or the like.

For example, the terminal may calculate the uplink timing advance by the following formula of:

$$TA = (N_{TA} + N_{TA,offset}[+X]) \times T_c[+X];$$

where, X is a common timing offset broadcasted by a network, $N_{TA}$ is obtained based on a specific timing advance of the terminal (UE specific TA), $N_{TA,offset}$ is an offset of TA which is defined in 3GPP TS38.213 section 4.2, and $T_c$ is a value defined in 3GPP TS38.211 section 4.1.

It should be noted that X in the above formula only appears once. For example, if it appears in the parentheses in the formula, it is $(N_{TA}+N_{TA,offset}+X) \times T_c$. In this case, X can be a unitless quantity. If it appears in the end of the formula, it is $TA=(N_{TA}+N_{TA,offset}) \times T_c+X$. In this case, the unit of X may be a time unit, such as millisecond, second, frame or the like.

In some embodiments, the common timing offset broadcasted by the network may include two parts. One part is the common timing offset that needs the terminal to compensate, referred to as $X_1$, and the other part is the common timing offset that needs the network (such as satellite, base station) to compensate, referred to as $X_2$. The terminal may determine the uplink timing advance according to the above embodiments, based on the common timing offset. $X_1$ which needs the terminal to compensate. In addition, the cell can also broadcast a sum of $X_1$ and $X_2$, and one of $X_1$ and $X_2$, the other of $X_1$ and $X_2$ can be obtained by the terminal through subtraction.

For example, the update configuration is applicable to $N_{TA}$, that is, the terminal updates $N_{TA}$ based on the update configuration, thereby updating TA, so that the update step may be an offset of $N_{TA}$ or a value of the same dimension as $N_{TA}$. For example, the update configuration is applicable to the overall uplink timing advance TA, that is, the terminal updates TA based on the update configuration, so that the update step may be an offset of TA or a value in units of time.

Taking the update configuration applicable to the overall uplink timing advance as an example, the uplink timing advance is updated based on the time drift rate R in the update configuration. An uplink timing advance $TA_0$ at a start moment may be determined and a duration t from the start moment to an update moment may be determined, and then the updated $$TA = TA_0 + t \times R.$$

Since the aerial device such as the satellite is generally in high speed motion, the uplink timing advance is constantly varying as the aerial device moves. Although the network may continuously send the adjustment command, such as the TA command, to the terminal to adjust the uplink timing advance to ensure that the adjusted uplink timing advance satisfies changes on the RTT among the terminal, the aerial device and the base station, the change on the RTT may reach 40 μs/s for the satellite located at the high altitude such as 600 kilometers. In some cases, such as when the subcarrier is 240 KHz, the maximum value that the network may adjust the TA by the adjustment command is 1 μs, so that when the change on the RTT is 40 μs/s, 40 adjustment commands need to be sent to the terminal per second, which may cause a lot of signaling overheads and increase the power consumption of the terminal.

According to the embodiments of the disclosure, the terminal may update the uplink timing advance based on the update configuration, so that even if the network does not send the adjustment command for the uplink timing advance to the terminal, the adjustment of the uplink timing advance may be automatically completed, which is beneficial to reducing the signal overhead and reducing the power consumption of the terminal.

In some embodiments, the terminal may carry the first update configuration in an uplink RRC message, such as UEAssistanceInformation, RRCSetupComplete, RRCResumeComplete. Or the terminal may carry the first update configuration in a MAC CE.

In some embodiments, the first update configuration includes at least one of:
whether to update the uplink timing advance, an update frequency for the uplink timing advance, an update step for the uplink timing advance, a suggested value of an uplink time alignment timer, or a suggested value of an uplink time alignment timer of a preconfigured uplink resource.

The uplink time alignment timer may be used by the terminal to determine whether the uplink is synchronized in the connected state. After the uplink time alignment timer expires, the terminal determines that there is no uplink synchronization; and the uplink time alignment timer of the preconfigured uplink resource (pur-TimeAlignmentTimer) may be used by the terminal to determine whether the uplink is synchronized in the non-connected state (for example, inactive state, idle state). After the uplink time alignment timer of the preconfigured uplink resource expires, the terminal determines that there is no uplink synchronization. The uplink time alignment timer of the preconfigured uplink resource may be carried in the configuration request of the preconfigured uplink resource, PURConfigurationRequest, and sent to the base station.

The preconfigured uplink resource (PUR) may be requested by the terminal in the connected state from the base station. When the base station configures the preconfigured uplink resource for the terminal, after the terminal enters the non-connected state and under a case that specific conditions are satisfied, the preconfigured uplink resources is used to communicate with the base station. The above-mentioned specific conditions include, but are not limited to, the validity of the timing advance of the terminal satisfies the requirements and the signal quality change of the serving cell does not exceed a certain threshold. The preconfigured uplink resource may be configured for a IoT terminal, such as LTE eMTC/NB-IoT terminal.

In some embodiments, the second update configuration includes at least one of:
whether to update the uplink timing advance, an update moment of updating the uplink timing advance, an update frequency for the uplink timing advance, an update step for the uplink timing advance, or a value of an uplink time alignment timer.

The update moment of updating the uplink timing advance may be indicated by the base station. The update moment indicated by the base station may be an absolute moment or a relative moment, for example, it is an offset relative to the moment when the terminal receives the second update configuration. In the case of indicating the absolute moment, it may specifically indicate which time-domain symbol in which subframe under which system frame number to be the update moment. In the case of indicating the relative moment, it may specifically indicate that the relative moment is how many time-domain symbols previous to or following the moment when the second update configuration is received by the terminal.

Figure 15:
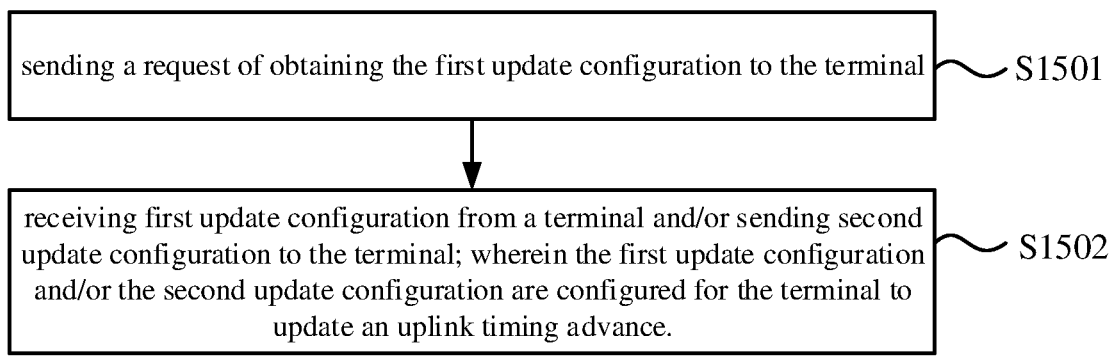
FIG. 15 is a schematic flowchart of another method for determining update configuration according to some embodiments of the disclosure.

FIG. 15 is a schematic flowchart of another method for determining update configuration according to some embodiments of the disclosure. As illustrated in FIG. 15, receiving the first update configuration from the terminal includes the following steps.

In step S1501, a request of obtaining the first update configuration is sent to the terminal.

In step S1502, the first update configuration is received from the terminal.

In some embodiments, the terminal may send the first update configuration to the base station after receiving the request from the base station to obtain the first update configuration. For example, the request may be UEInformationRequest, and for the request, the terminal may carry the first update configuration in UEInformationResponse and sent to the base station, and then the base station receives the first update configuration.

Figure 16:
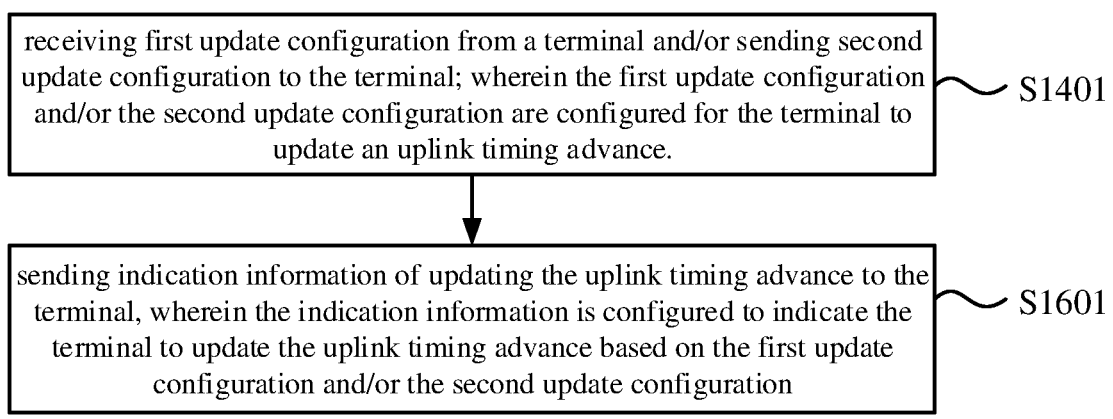
FIG. 16 is a schematic flowchart of another method for determining update configuration according to some embodiments of the disclosure.

FIG. 16 is a schematic flowchart of another method for determining update configuration according to some embodiments of the disclosure. As illustrated in FIG. 16, the method further includes the following step.

In step S1601, indication information of updating the uplink timing advance is sent to the terminal, in which the indication information is configured to indicate the terminal to update the uplink timing advance based on the first update configuration and/or the second update configuration.

In some embodiments, the operation of updating the uplink timing advance by the terminal based on the update configuration may be performed only when receiving the indication information of updating the uplink timing advance from the base station, which facilitates controlling the terminal by the base station.

Figure 17:
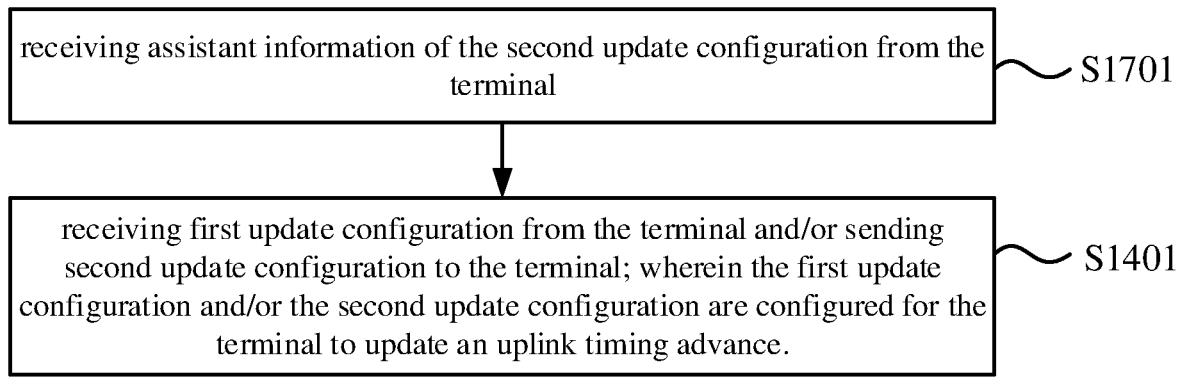
FIG. 17 is a schematic flowchart of another method for determining update configuration according to some embodiments of the disclosure.

FIG. 17 is a schematic flowchart of another method for determining update configuration according to some embodiments of the disclosure. As illustrated in FIG. 17, the method further includes the following step.

In step S1701, assistant information of the second update configuration is received from the terminal.

In some embodiments, the terminal may send the assistant information of the second update configuration to the base station, and the base station may determine the second update configuration based on the received assistant information, so that the second update configuration sent to the terminal satisfies the needs of the terminal.

The terminal may carry the assistant information of the second update configuration in UEAssistanceInformation and send it to the base station. The assistant information of the second update configuration includes but is not limited to at least one of the following: a suggested value of the update frequency for the uplink timing advance, a suggested value of the update step for the uplink timing advance, a suggested value of the uplink time alignment timer, or a suggested value of the uplink time alignment timer of the preconfigured uplink resource.

Figure 18:
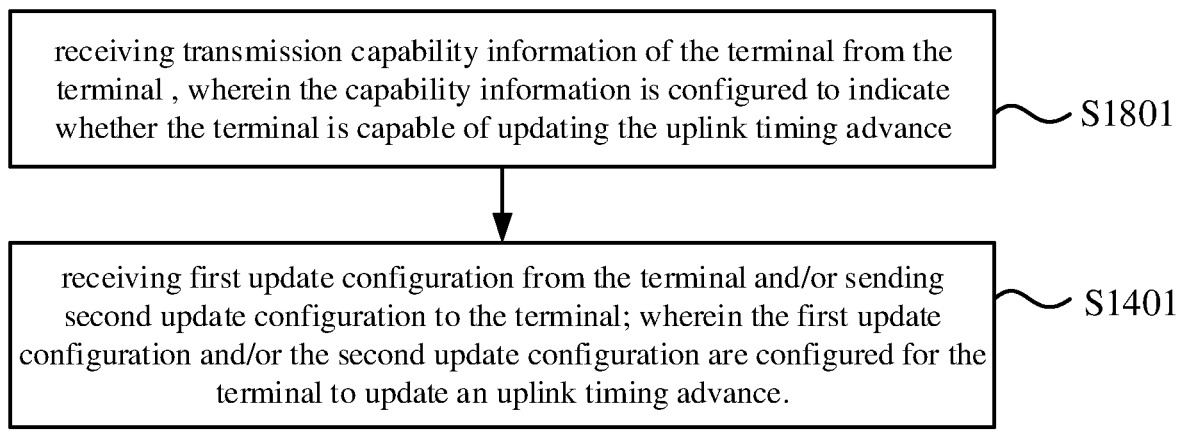
FIG. 18 is a schematic flowchart of another method for determining update configuration according to some embodiments of the disclosure.

FIG. 18 is a schematic flowchart of another method for determining update configuration according to some embodiments of the disclosure. As illustrated in FIG. 18, the method further includes the following step.

In step S1801, transmission capability information of the terminal is received from the terminal, in which the capability information is configured to indicate whether the terminal is capable of updating the uplink timing advance.

In some embodiments, the terminal may send the capability information to the base station, and use the capability information to inform the base station whether the terminal supports updating the uplink timing advance, in which the capability information may be carried in UECapabilityInformation and sent to the terminal.

Figure 19:
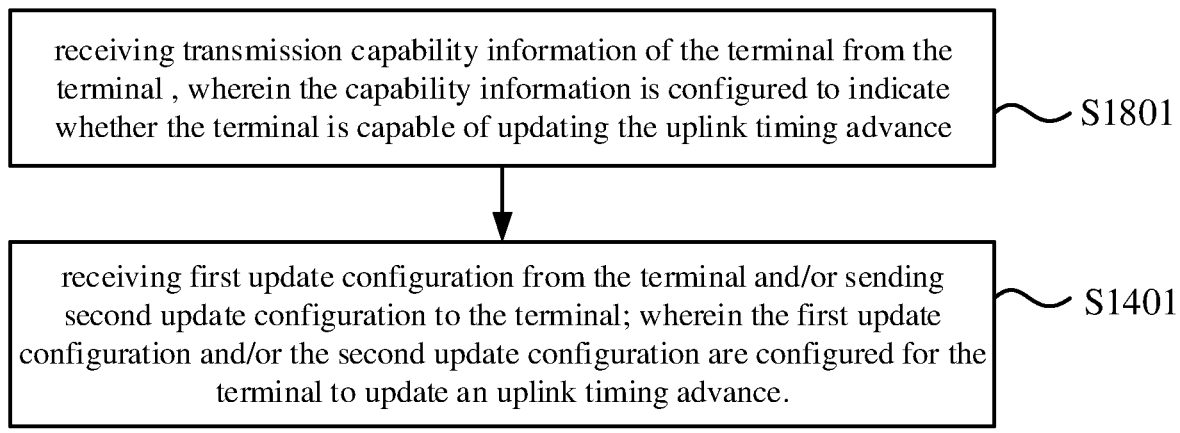
FIG. 19 is a schematic flowchart of another method for determining update configuration according to some embodiments of the disclosure.

FIG. 19 is a schematic flowchart of another method for determining update configuration according to some embodiments of the disclosure. As illustrated in FIG. 19, sending the second update configuration to the terminal includes the following step.

In step S1901, the second update configuration is sent to the terminal in response to the terminal being capable of updating the uplink timing advance.

In some embodiments, the base station sends the second update configuration to the terminal only when it is determined according to the capability information that the terminal supports updating the uplink timing advance, so that the terminal receives the second update configuration; otherwise, the base station does not send the second update configuration to the terminal, and the terminal does not have to receive the second update configuration, so as to avoid wasting communication resources.

Corresponding to the foregoing embodiments of the methods for updating an uplink timing advance and the methods for determining update configuration, the disclosure also provides some embodiments of the apparatuses for updating an uplink timing advance and the apparatuses for determining update configuration.

Figure 20:
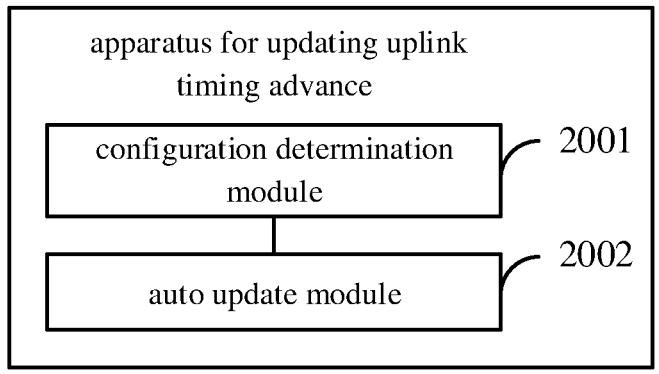
FIG. 20 is a schematic block diagram of an apparatus for updating an uplink timing advance according to some embodiments of the disclosure.

FIG. 20 is a schematic block diagram of an apparatus for updating an uplink timing advance according to some embodiments of the disclosure. The method for updating an uplink timing advance illustrated in some embodiments may be applicable to a terminal. The terminal includes but is not limited to an electronic device such as a mobile phone, a tablet computer, a wearable device, a sensor or an IoT device. The terminal, as a UE, may communicate with a base station. The base station includes but is not limited to a 4G base station, a 5G base station or a 6G base station.

In some embodiments, the terminal and the base station may be located on the ground. The terminal may communicate with the base station through an aerial device. For example, the base station sends information to the aerial device, and the aerial device sends the information to the terminal. The aerial device includes but is not limited to a satellite, a UAV or an aerial platform. The aerial device may move in the air.

As illustrated in FIG. 20, the apparatus for updating an uplink timing advance may include a configuration determination module 2001 and an auto update module 2002.

The configuration determination module 2001 is configured to determine update configuration.

The auto update module 2002 is configured to update the uplink timing advance based on the update configuration.

Figure 21:
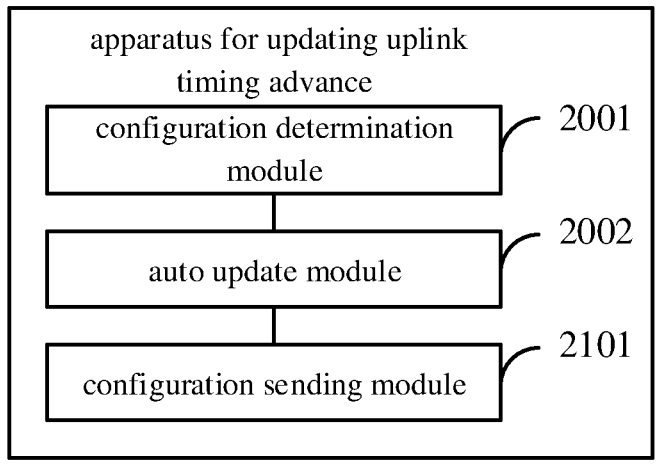
FIG. 21 is a schematic block diagram of another apparatus for updating an uplink timing advance according to some embodiments of the disclosure.

FIG. 21 is a schematic block diagram of another apparatus for updating an uplink timing advance according to some embodiments of the disclosure. As illustrated in FIG. 21, the update configuration is first update configuration determined by the terminal autonomously, and the apparatus further includes a configuration sending module 2101.

The configuration sending module 2101 is configured to send the first update configuration to a base station.

In some embodiments, the first update configuration includes at least one of:

whether to update the uplink timing advance, an update frequency for the uplink timing advance, an update step for the uplink timing advance, a suggested value of an uplink time alignment timer, or a suggested value of an uplink time alignment timer of a preconfigured uplink resource.

In some embodiments, the configuration sending module is configured to send the first update configuration to the base station in response to receiving a request from the base station to obtain the first update configuration.

In some embodiments, the update module is configured to update the uplink timing advance based on the update configuration in response to receiving indication information of updating the uplink timing advance from the base station.

In some embodiments, the configuration determination module is configured to receive second update configuration of updating the uplink timing advance from a base station.

In some embodiments, the second update configuration includes at least one of:

whether to update the uplink timing advance, an update moment of updating the uplink timing advance, an update frequency for the uplink timing advance, an update step for the uplink timing advance, or a value of an uplink time alignment timer.

In some embodiments, the update module is configured to update the uplink timing advance based on first update configuration determined by the terminal before receiving the second update configuration, and update the uplink timing advance based on the second update configuration after receiving the second update configuration.

Figure 22:
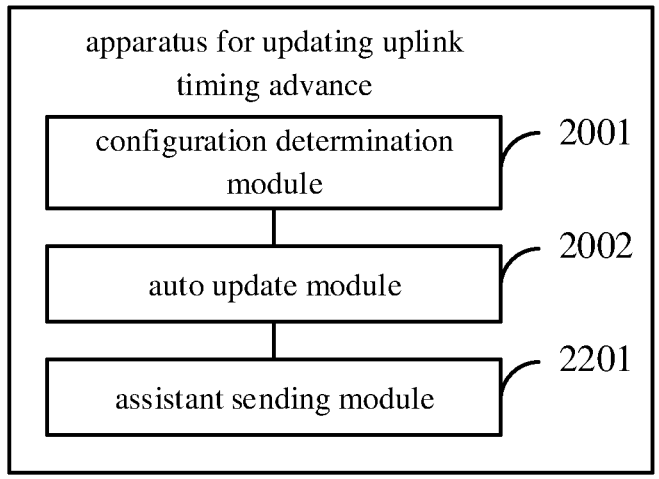
FIG. 22 is a schematic block diagram of another apparatus for updating an uplink timing advance according to some embodiments of the disclosure.

FIG. 22 is a schematic block diagram of another apparatus for updating an uplink timing advance according to some embodiments of the disclosure. As illustrated in FIG. 22, the apparatus further includes an assistant sending module 2201.

The assistant sending module 2201 is configured to send assistant information of the second update configuration to the base station.

In some embodiments, the update module is configured to update the uplink timing advance once based on stored update configuration before receiving the second update configuration with a moment when the second update configuration is received, a moment previous to when the second update configuration is received or a moment following when the second update configuration is received as an update moment, and update the uplink timing advance after being updated once based on the second update configuration.

Figure 23:
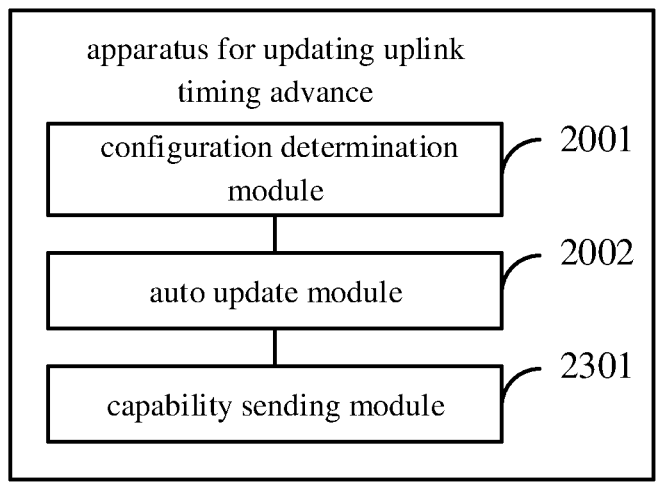
FIG. 23 is a schematic block diagram of another apparatus for updating an uplink timing advance according to some embodiments of the disclosure.

FIG. 23 is a schematic block diagram of another apparatus for updating an uplink timing advance according to some embodiments of the disclosure. As illustrated in FIG. 23, the apparatus further includes a capability sending module 2301.

The capability sending module 2301 is configured to send capability information to the base station, in which the capability information is configured to indicate whether the terminal is capable of updating the uplink timing advance.

In some embodiments, the configuration determination module is configured to receive the second update configuration of updating the uplink timing advance from the base station in response to the terminal being capable of updating the uplink timing advance.

Figure 24:
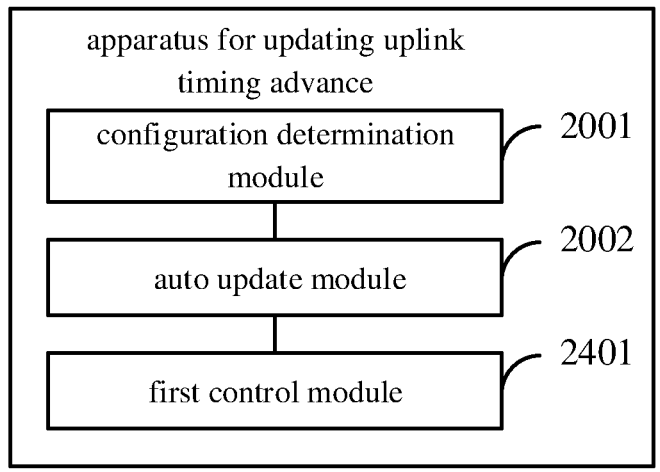
FIG. 24 is a schematic block diagram of another apparatus for updating an uplink timing advance according to some embodiments of the disclosure.

FIG. 24 is a schematic block diagram of another apparatus for updating an uplink timing advance according to some embodiments of the disclosure. As illustrated in FIG. 24, the apparatus further includes a first control module 2401.

The first control module 2401 is configured to start or restart an uplink time alignment timer after the uplink timing advance is updated based on the update configuration.

Figure 25:
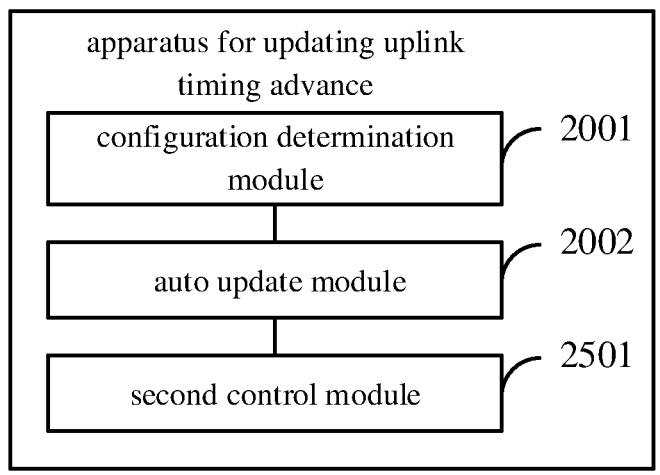
FIG. 25 is a schematic block diagram of another apparatus for updating an uplink timing advance according to some embodiments of the disclosure.

FIG. 25 is a schematic block diagram of another apparatus for updating an uplink timing advance according to some embodiments of the disclosure. As illustrated in FIG. 25, the apparatus further includes a second control module 2501.

The second control module 2501 is configured to start or restart an uplink time alignment timer of a preconfigured uplink resource after the uplink timing advance is updated based on the update configuration.

In some embodiments, the update module is configured to update the uplink timing advance based on the update configuration with a moment of receiving an adjustment command for the uplink timing advance from the base station, a moment previous to when the adjustment command is received, or a moment following when the adjustment command is received as the update moment.

Figure 26:
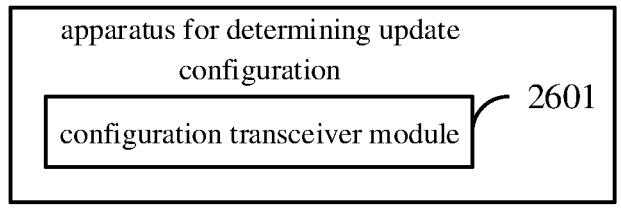
FIG. 26 is a schematic block diagram of an apparatus for determining update configuration according to some embodiments of the disclosure.

FIG. 26 is a schematic block diagram of an apparatus for determining update configuration according to some embodiments of the disclosure. The apparatus for determining update configuration illustrated in some embodiments may be applicable to a base station. The base station includes but is not limited to a 4G base station, a 5G base station or a 6G base station. The base station may communicate with a terminal that is a UE. The terminal includes but is not limited to an electronic device such as a mobile phone, a tablet computer, a wearable device, a sensor or an IoT device. In some embodiments, the terminal may be a terminal to which the apparatus for updating an uplink timing advance described in any of the foregoing embodiments is applicable.

In some embodiments, the terminal and the base station may be located on the ground. The terminal may communicate with the base station through an aerial device. For example, the base station sends information to the aerial device, and the aerial device sends the information to the terminal. The aerial device includes but is not limited to a satellite, a UAV or an aerial platform. The aerial device may move in the air.

As illustrated in FIG. 26, the apparatus for determining update configuration may include a configuration transceiver module 2601.

The configuration transceiver module 2601 is configured to receive first update configuration from a terminal and/or send second update configuration to the terminal.

The first update configuration and/or the second update configuration are configured for the terminal to update an uplink timing advance.

In some embodiments, the first update configuration includes at least one of:
 whether to update the uplink timing advance, an update frequency for the uplink timing advance, an update step for the uplink timing advance, a suggested value of an uplink time alignment timer, or a suggested value of an uplink time alignment timer of a preconfigured uplink resource.

In some embodiments, the second update configuration includes at least one of:
 whether to update the uplink timing advance, an update moment of updating the uplink timing advance, an update frequency for the uplink timing advance, an update step for the uplink timing advance, or a value of an uplink time alignment timer.

In some embodiments, the configuration transceiver module is configured to send a request of obtaining the first update configuration to the terminal; and receive the first update configuration from the terminal.

Figure 27:
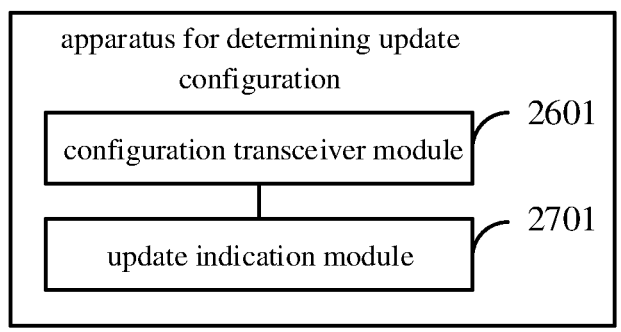
FIG. 27 is a schematic block diagram of another apparatus for determining update configuration according to some embodiments of the disclosure.

FIG. 27 is a schematic block diagram of another apparatus for determining update configuration according to some embodiments of the disclosure. As illustrated in FIG. 27, the apparatus further includes an update indication module 2701.

The update indication module 2701 is configured to send indication information of updating the uplink timing advance to the terminal, in which the indication information is configured to indicate the terminal to update the uplink timing advance based on the first update configuration and/or the second update configuration.

Figure 28:
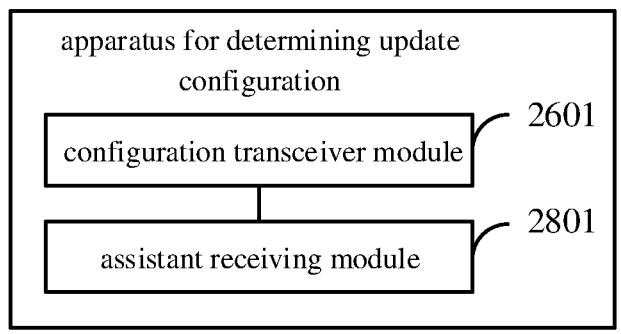
FIG. 28 is a schematic block diagram of another apparatus for determining update configuration according to some embodiments of the disclosure.

FIG. 28 is a schematic block diagram of another apparatus for determining update configuration according to some embodiments of the disclosure. As illustrated in FIG. 28, the apparatus further includes an assistant receiving module 2801.

The assistant receiving module 2801 is configured to receive assistant information of the second update configuration from the terminal.

Figure 29:
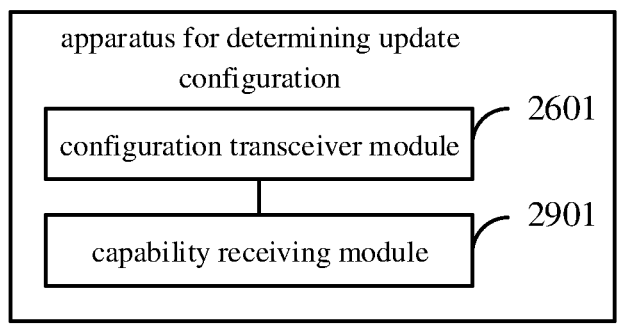
FIG. 29 is a schematic block diagram of another apparatus for determining update configuration according to some embodiments of the disclosure.

FIG. 29 is a schematic block diagram of another apparatus for determining update configuration according to some embodiments of the disclosure. As illustrated in FIG. 29, the apparatus further includes a capability receiving module 2901.

The capability receiving module 2901 is configured to receive transmission capability information of the terminal from the terminal, in which the capability information is configured to indicate whether the terminal is capable of updating the uplink timing advance.

In some embodiments, the configuration transceiver module is configured to send the second update configuration to the terminal in response to the terminal being capable of updating the uplink timing advance.

With respect to the apparatuses in the above embodiments, the specific manners for performing operations for individual modules therein have been described in detail in the embodiments regarding the methods, which will not be elaborated herein.

For the apparatus embodiments, since they basically correspond to the method embodiments, reference may be made to the partial descriptions of the method embodiments for related parts. The apparatus embodiments described above are only illustrative, in which modules described as separate components may or may not be physically separated, and components displayed as modules may or may not be physical modules, that is, they may be located in one place or distributed on multiple network modules. Some or all of the modules may be selected according to actual needs to achieve purposes of solutions in embodiments. A person skilled in the art may understand and implement it without creative effort.

Embodiments of the disclosure also provide an electronic device, including:
 a processor; and
 a memory for storing instructions executable by the processor.

The processor is configured to perform the method for updating an uplink timing advance described in any of the foregoing embodiments, and/or the method for determining update configuration described in any of the foregoing embodiments.

Embodiments of the disclosure also provide a computer-readable storage medium, on which a computer program is stored, and when the program is executed by a processor, the steps in the method for updating an uplink timing advance described in any of the foregoing embodiments, and/or in the method for determining update configuration described in any of the foregoing embodiments, are realized.

Figure 30:
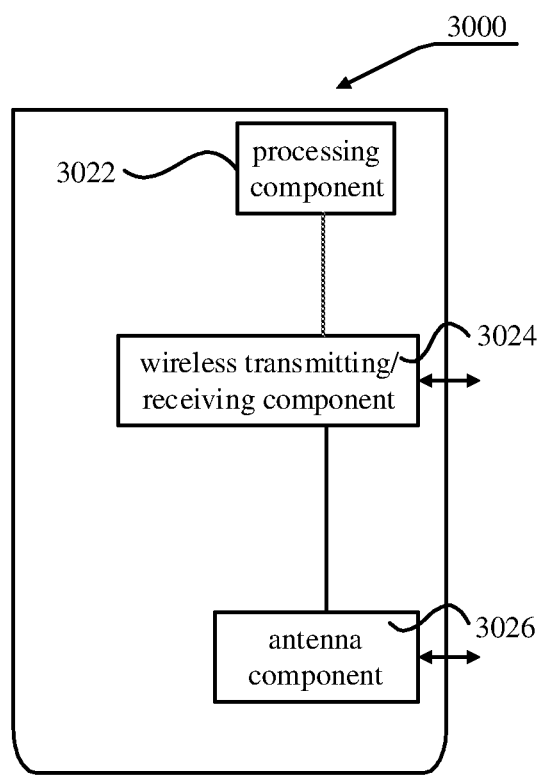
FIG. 30 is a schematic block diagram of a device for determining update configuration according to some embodiments of the disclosure.

As illustrated in FIG. 30, FIG. 30 is a schematic block diagram of a device 3000 for determining update configuration according to some embodiments of the disclosure. The device 3000 may be provided as a base station. As illustrated in FIG. 30, the device 3000 includes a processing component 3022, a wireless transmitting/receiving component 3024, an antenna component 3026, and a signal processing unit peculiar to a wireless interface. The processing component 3022 may further include one or more processors. One processor of the processing component 3022 may be configured to implement the method for determining update configuration as described in the above any embodiment.

Figure 31:
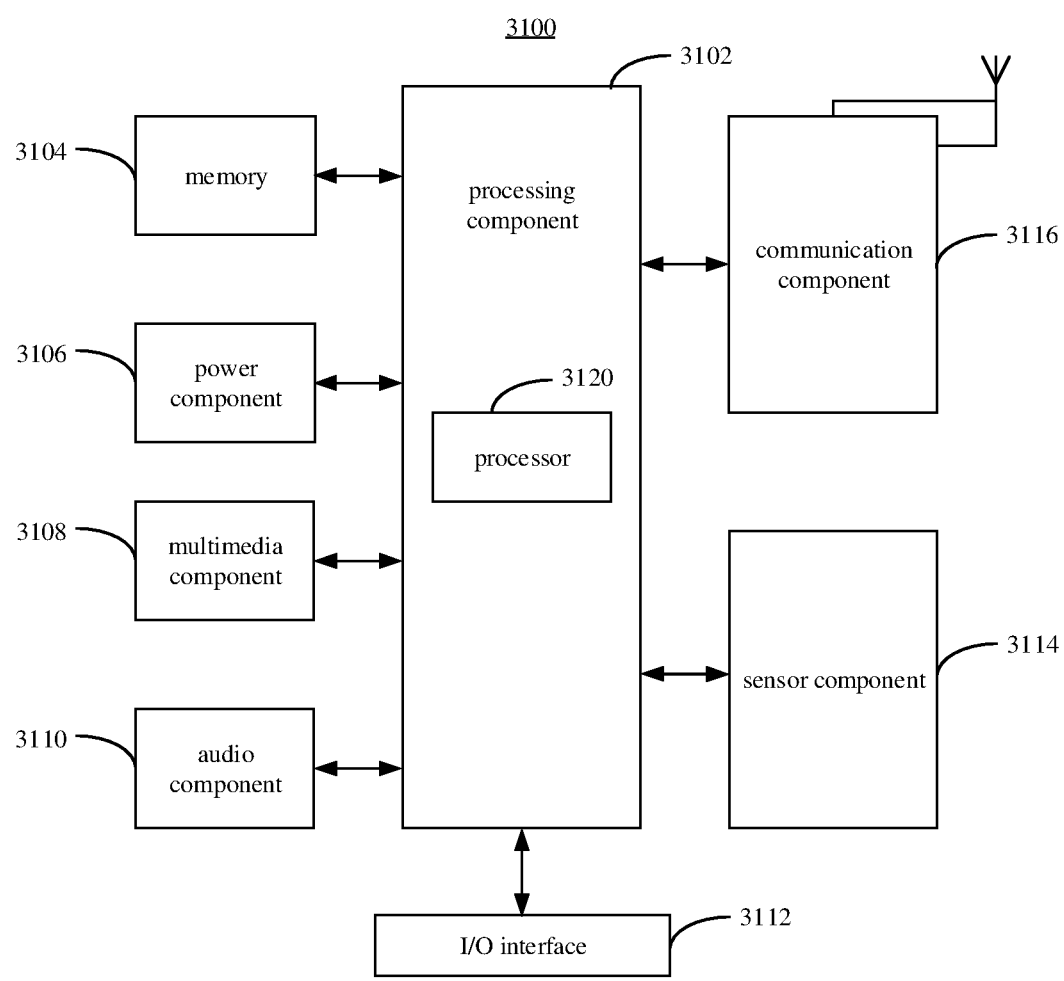
FIG. 31 is a schematic block diagram of a device for updating an uplink timing advance according to some embodiments of the disclosure.

FIG. 31 is a schematic block diagram illustrating a device 3100 for determining an uplink timing advance according to some embodiments the disclosure. For example, the device 3100 may be a mobile phone, a computer, a digital broadcast terminal, a messaging device, a gaming console, a tablet, a medical device, exercise equipment, a personal digital assistant, and the like.

Referring to FIG. 31, the device 3100 may include one or more of the following components: a processing component 3102, a memory 3104, a power component 3106, a multimedia component 3108, an audio component 3110, an input/output (I/O) interface 3112, a sensor component 3114, and a communication component 3116.

The processing component 3102 typically controls overall operations of the device 3100, such as the operations associated with display, telephone calls, data communications, camera operations, and recording operations. The processing component 3102 may include one or more processors 3120 to execute instructions to perform all or part of the steps in the above described methods for determining an uplink timing advance. Moreover, the processing component 3102 may include one or more modules which facilitate the interaction between the processing component 3102 and other components. For instance, the processing component 3102 may include a multimedia module to facilitate the interaction between the multimedia component 3108 and the processing component 3102.

The memory 3104 is configured to store various types of data to support the operation of the device 3100. Examples of such data include instructions for any applications or methods operated on the device 3100, contact data, phonebook data, messages, pictures, video, etc. The memory 3104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 3106 provides power to various components of the device 3100. The power component 3106 may include a power management system, one or more power sources, and any other components associated with the generation, management, and distribution of power in the device 3100.

The multimedia component 3108 includes a screen providing an output interface between the device 3100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 3108 includes a front camera and/or a rear camera. The front camera and the rear camera may receive an external multimedia datum while the device 3100 is in an operation mode, such as a photographing mode or a video mode. Each of the front camera and the rear camera may be a fixed optical lens system or have focus and optical zoom capability.

The audio component 3110 is configured to output and/or input audio signals. For example, the audio component 3110 includes a microphone ("MIC") configured to receive an external audio signal when the device 3100 is in an operation mode, such as a call mode, a recording mode, and a voice recognition mode. The received audio signal may be further stored in the memory 3104 or transmitted via the communication component 3116. In some embodiments, the audio component 3110 further includes a speaker to output audio signals.

The I/O interface 3112 provides an interface between the processing component 3102 and peripheral interface modules, such as a keyboard, a click wheel, buttons, and the like. The buttons may include, but are not limited to, a home button, a volume button, a starting button, and a locking button.

The sensor component 3114 includes one or more sensors to provide status assessments of various aspects of the device 3100. For instance, the sensor component 3114 may detect an open/closed status of the device 3100, relative positioning of components, e.g., the display and the keypad, of the device 3100, a change in position of the device 3100 or a component of the device 3100, a presence or absence of user contact with the device 3100, an orientation or an acceleration/deceleration of the device 3100, and a change in temperature of the device 3100. The sensor component 3114 may include a proximity sensor configured to detect the presence of nearby objects without any physical contact. The sensor component 3114 may also include a light sensor, such as a CMOS or CCD image sensor, for use in imaging applications. In some embodiments, the sensor component 3114 may also include an accelerometer sensor, a gyroscope sensor, a magnetic sensor, a pressure sensor, or a temperature sensor.

The communication component 3116 is configured to facilitate communication, wired or wirelessly, between the device 3100 and other devices. The device 3100 may access a wireless network based on a communication standard, such as Wi-Fi, second generation (2G) or third generation (3G), fourth generation (4G) Long Term Evolution (LTE), fifth generation (5G) new radio (NR), or a combination thereof. In some embodiments, the communication component 3116 receives a broadcast signal or broadcast associated information from an external broadcast management system via a broadcast channel. In some embodiments, the communication component 3116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the device 3100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods for determining an uplink timing advance.

In some embodiments, there is also provided a non-transitory computer-readable storage medium including instructions, such as included in the memory 3104, executable by the processor 3120 in the device 3100, for performing the above-described methods for determining an uplink timing advance. For example, the non-transitory computer-readable storage medium may be a ROM, a RAM, a CD-ROM, a magnetic tape, a floppy disc, an optical data storage device, and the like.

Other embodiments of the disclosure will be apparent to a person skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes may be made without departing from the scope thereof. It is intended that the scope of the disclosure only be limited by the appended claims.

It should be noted that, in the disclosure, relational terms such as first and second are used only to distinguish one entity or operation from another entity or operation, and do not necessarily require or imply any such actual relationship or sequence exists between these entities or operations. The terms "comprising", "including" or any other variation thereof are intended to encompass non-exclusive inclusion such that a process, method, article, or device including a list of elements includes not only those elements, but also other elements not expressly listed, or also include elements inherent to such the process, method, article, or device. Without further limitation, an element qualified by the phrase "including a . . . " does not preclude the presence of additional identical elements in the process, method, article, or device that includes the element.

The methods and apparatuses or devices provided by embodiments of the disclosure have been described in detail above, and specific examples are used to illustrate the principles and implementations of the disclosure. At the same time, for a person skilled in the art, according to the idea of the disclosure, there will be changes in the specific implementation and application scope. In summary, the content of this specification should not be construed as limiting the disclosure.

What is claimed is:

1. A method for updating an uplink timing advance, performed by a terminal, the method comprising:
   determining first update configuration based on a position of the terminal and a position of a satellite;
   receiving second update configuration of updating the uplink timing advance from a base station, wherein the second update configuration comprises a common timing offset and a time drift rate; and
   updating the uplink timing advance automatically based on the first update configuration and the second update configuration, comprising:
   calculating the uplink timing advance based on $TA=(N_{TA}+N_{TA,offset}+X) \times T_c$,
   where TA represents the uplink timing advance, X represents the common timing offset, $N_{TA}$ represents a specific timing advance of the terminal, $N_{TA,offset}$ represents an offset of the TA, and $T_c$ represents a time unit.

2. The method of claim 1, wherein the method further comprises:
   sending the first update configuration to the base station.

3. The method of claim 2, wherein the first update configuration comprises at least one of:
   whether to update the uplink timing advance, an update frequency for the uplink timing advance, an update step for the uplink timing advance, a suggested value of an uplink time alignment timer, or a suggested value of an uplink time alignment timer of a preconfigured uplink resource.

4. The method of claim 2, wherein sending the first update configuration to the base station comprises:
   sending the first update configuration to the base station in response to receiving a request from the base station to obtain the first update configuration.

5. The method of claim 1, wherein updating the uplink timing advance automatically based on the first update configuration and the second update configuration comprises:
   updating the uplink timing advance automatically based on the first update configuration and the second update configuration in response to receiving indication information of updating the uplink timing advance from the base station.

6. The method of claim 1, wherein the second update configuration comprises at least one of:
   whether to update the uplink timing advance, an update moment of updating the uplink timing advance, an update frequency for the uplink timing advance, an update step for the uplink timing advance, or a value of an uplink time alignment timer.

7. The method of claim 1, wherein updating the uplink timing advance automatically based on the first update configuration and the second update configuration comprises at least one of:
   updating the uplink timing advance based on first update configuration determined by the terminal before receiving the second update configuration; or
   updating the uplink timing advance based on the second update configuration after receiving the second update configuration.

8. The method of claim 1, further comprising:
   sending assistant information of the second update configuration to the base station.

9. The method of claim 5, wherein updating the uplink timing advance automatically based on the first update configuration and the second update configuration comprises: updating the uplink timing advance once based on stored update configuration before receiving the second update configuration of at least one of: a moment when the second update configuration is received, a moment previous to when the second update configuration is received, or a moment following when the second update configuration is received.

10. The method of claim 1, further comprising:
sending capability information to the base station, wherein the capability information is configured to indicate whether the terminal is capable of updating the uplink timing advance,
wherein receiving the second update configuration of updating the uplink timing advance from the base station comprises:
receiving the second update configuration of updating the uplink timing advance from the base station in response to the terminal being capable of updating the uplink timing advance.

11. The method of claim 1, further comprising one of:
starting or restarting an uplink time alignment timer after the uplink timing advance is updated based on the update configuration; or
starting or restarting an uplink time alignment timer of a preconfigured uplink resource after the uplink timing advance is updated based on the update configuration.

12. The method of claim 1, wherein updating the uplink timing advance automatically based on the first update configuration and the second update configuration comprises:
updating the uplink timing advance automatically based on the first update configuration and the second update configuration at at least one of: a moment of receiving an adjustment command for the uplink timing advance from the base station, a moment previous to when the adjustment command is received, or a moment following when the adjustment command is received.

13. A method for determining update configuration, performed by a base station, the method comprising at least one of:
receiving first update configuration from a terminal, wherein the first update configuration is determined based on a position of the terminal and a position of a satellite; or
sending second update configuration to the terminal, wherein the second update configuration comprises a common timing offset and a time drift rate;
wherein the first update configuration and the second update configuration are configured for the terminal to update an uplink timing advance automatically,
wherein the uplink timing advance is calculated based on $TA=(N_{TA}+N_{TA,offset}+X) \times T_c$,
where TA represents the uplink timing advance, X represents the common timing offset, $N_{TA}$ represents a specific timing advance of the terminal, $N_{TA,offset}$ represents an offset of the TA, and $T_c$ represents a time unit.

14. The method of claim 13, wherein receiving the first update configuration from the terminal comprises:
sending a request of obtaining the first update configuration to the terminal; and
receiving the first update configuration from the terminal.

15. The method of claim 13, further comprising:
sending indication information of updating the uplink timing advance to the terminal, wherein the indication information is configured to indicate the terminal to update the uplink timing advance based on the first update configuration and the second update configuration.

16. The method of claim 13, further comprising:
receiving assistant information of the second update configuration from the terminal.

17. The method of claim 13, further comprising:
receiving transmission capability information of the terminal from the terminal, wherein the capability information is configured to indicate whether the terminal is capable of updating the uplink timing advance,
wherein sending the second update configuration to the terminal comprises:
sending the second update configuration to the terminal in response to the terminal being capable of updating the uplink timing advance.

18. A terminal, comprising:
a processor; and
a memory for storing instructions executable by the processor;
wherein the processor is configured to:
determine first update configuration based on a position of the terminal and a position of a satellite;
receive second update configuration of updating the uplink timing advance from a base station, wherein the second update configuration comprises a common timing offset and a time drift rate; and
update the uplink timing advance automatically based on the first update configuration and the second update configuration, comprising:
calculating the uplink timing advance based on $TA=(N_{TA}+N_{TA,offset}+X) \times T_c$,
where TA represents the uplink timing advance, X represents the common timing offset, $N_{TA}$ represents a specific timing advance of the terminal, $N_{TA,offset}$ represents an offset of the TA, and $T_c$ represents a time unit.

19. A base station, comprising:
a processor; and
a memory for storing instructions executable by the processor;
wherein the processor is configured to perform the method of claim 13.

* * * * *